US012213524B2

(12) United States Patent
Liu et al.

(10) Patent No.: US 12,213,524 B2
(45) Date of Patent: Feb. 4, 2025

(54) ULTRASONIC ATOMIZER

(71) Applicant: CHINA TOBACCO HUNAN INDUSTRIAL CO., LTD., Hunan (CN)

(72) Inventors: Jianfu Liu, Hunan (CN); Kejun Zhong, Hunan (CN); Xiaoyi Guo, Hunan (CN); Xinqiang Yin, Hunan (CN); Jianhua Yi, Hunan (CN); Yongquan Zhou, Hunan (CN)

(73) Assignee: CHINA TOBACCO HUNAN INDUSTRIAL CO., LTD., Hunan (CN)

( * ) Notice: Subject to any disclaimer, the term of this patent is extended or adjusted under 35 U.S.C. 154(b) by 362 days.

(21) Appl. No.: 17/774,844

(22) PCT Filed: Nov. 6, 2020

(86) PCT No.: PCT/CN2020/126934
§ 371 (c)(1),
(2) Date: May 5, 2022

(87) PCT Pub. No.: WO2021/088948
PCT Pub. Date: May 14, 2021

(65) Prior Publication Data

US 2022/0395023 A1 Dec. 15, 2022

(30) Foreign Application Priority Data

Nov. 8, 2019 (CN) ......................... 201911085956.5
Nov. 8, 2019 (CN) ......................... 201921927107.5

(51) Int. Cl.
*A24F 40/44* (2020.01)
*A24F 40/05* (2020.01)
(Continued)

(52) U.S. Cl.
CPC .............. *A24F 40/44* (2020.01); *A24F 40/05* (2020.01); *A24F 40/10* (2020.01); *A24F 40/42* (2020.01); *B05B 17/0684* (2013.01)

(58) Field of Classification Search
None
See application file for complete search history.

(56) References Cited

U.S. PATENT DOCUMENTS 9,999,250 B2 6/2018 Minskoff et al.

FOREIGN PATENT DOCUMENTS

CN 103750569 A 4/2014
CN 203952443 U 11/2014
(Continued)

OTHER PUBLICATIONS

English machine translation of CN206341940; Liu; Jul. 21, 2017; 32 pages. (Year: 2017).*
(Continued)

*Primary Examiner* — Linda L Gray
(74) *Attorney, Agent, or Firm* — MASCHOFF BRENNAN; Ran Pang; Michael Mauriel

(57) ABSTRACT

The present invention relates to an electronic cigarette set, in particular to an ultrasonic atomizer, comprising an e-liquid guide assembly. In an embodiment, the e-liquid guide assembly comprises an e-liquid guide ceramic, e-liquid guide cotton, and springs located between the e-liquid guide ceramic and the e-liquid guide cotton and abut the e-liquid guide cotton against an atomization piece. Embodiments of the present invention use a combination of an e-liquid guide ceramic and e-liquid guide cotton to guide an e-liquid. Further details are disclosed herein.

7 Claims, 5 Drawing Sheets

(51) Int. Cl.

| | |
|---|---|
| ***A24F 40/10*** | (2020.01) |
| ***A24F 40/42*** | (2020.01) |
| ***B05B 17/00*** | (2006.01) |
| ***B05B 17/06*** | (2006.01) |

(56) References Cited

FOREIGN PATENT DOCUMENTS

| | | | | |
|---|---|---|---|---|
| CN | 206687173 U | | 12/2017 | |
| CN | 211065034 U | | 7/2020 | |
| EP | 2842640 A1 | * | 3/2015 | ............ B05B 17/06 |

OTHER PUBLICATIONS

English machine translation of CN105901775; Li; Aug. 31, 2016; 18 pages. (Year: 2016).*

English machine translation of CN 105559151; Liu; May 11, 2016; 21 pages. (Year: 2016).*

International Search Report issued in International Application No. PCT/CN2020/126934 dated Jan. 19, 2021, 2 pages.

* cited by examiner

ULTRASONIC ATOMIZER

CROSS REFERENCE TO RELATED APPLICATIONS

This application is a U.S. National Phase application under 35 U.S.C. § 371 of International Application No. PCT/CN2020/126934 filed on Nov. 6, 2020, and claims priority to Chinese Application No. 201911085956.5 filed on Nov. 8, 2019, and Chinese Application No. 201921927107.5 filed on Nov. 8, 2019. The entire contents of these applications are hereby incorporated herein by reference.

FIELD OF THE INVENTION

The present invention relates to an electronic cigarette set, in particular to an ultrasonic atomizer.

BACKGROUND OF THE INVENTION

Existing ultrasonic electronic cigarette atomizers generally guide e-liquid by means of direct communication of e-liquid guide cotton and an e-liquid bin, and the material of the e-liquid guide cotton is generally aramid fiber, non-woven fabric, etc. The inventor found that this e-liquid guide cotton has the following problems:

1. When the temperature of e-liquid in the e-liquid bin increases with the progress of ultrasonic atomization, the viscosity of e-liquid decreases, so that the flow rate of e-liquid on the e-liquid guide cotton rapidly increases, the e-liquid guide amount of the e-liquid guide cotton increases, and excessive e-liquid is supplied to an ultrasonic atomization piece, easily causing the problem that the ultrasonic atomization piece is immersed in e-liquid and other problems;
2. When the temperature of e-liquid increases with the progress of ultrasonic atomization and its viscosity decreases, after the e-liquid guide cotton absorbs e-liquid, the increase in the pore size of the e-liquid guide cotton also increases the e-liquid guide rate of e-liquid on the e-liquid guide cotton, which further easily causes the phenomenon that the ultrasonic atomization piece is immersed in the e-liquid.

SUMMARY OF THE INVENTION

The technical problem to be solved by the present invention is to overcome the shortcoming that the existing electronic cigarette atomizer is easily affected by temperature to increase the e-liquid guide rate of e-liquid on an e-liquid guide body, and to provide an ultrasonic atomizer in which the e-liquid guide rate is not affected by the temperature increase of e-liquid.

In order to solve the above technical problem, the present invention provides an ultrasonic atomizer, including an e-liquid guide assembly, wherein the e-liquid guide assembly includes an e-liquid guide ceramic in direct contact with e-liquid, e-liquid guide cotton which is located below the e-liquid guide ceramic and is in direct contact with the e-liquid guide ceramic, and a spring which is located between the e-liquid guide ceramic and the e-liquid guide cotton and abuts the e-liquid guide cotton against an atomization piece the e-liquid guide ceramic is a solid ceramic, and micropores which are used for conducting the e-liquid are integrally formed on the e-liquid guide ceramic.

The e-liquid guide assembly of the present invention is formed by two different e-liquid guide materials (e-liquid guide ceramic and e-liquid guide cotton), and the upper section of the e-liquid guide assembly is the e-liquid guide ceramic having a constant porosity (the porosity of the e-liquid guide ceramic is determined after being formed), so that the diameters of e-liquid channels formed by the micropores of the e-liquid guide ceramic will not expand or shrink due to immersion in e-liquid, that is, the material characteristic of the e-liquid guide ceramic ensures constant diameters of the e-liquid guide channels formed in the e-liquid guide ceramic, which then ensures a constant amount of e-liquid conducted by the e-liquid guide ceramic per unit time and avoids unstable e-liquid guide rate due to the decrease in the viscosity of e-liquid. The lower section of the e-liquid guide assembly is the e-liquid guide cotton, which expands in excessive e-liquid and shrinks in little e-liquid, so that the e-liquid guide amount of the e-liquid guide cotton is unstable. Therefore, in the present invention, the e-liquid guide cotton is not directly connected to the e-liquid bin, but connected to the e-liquid bin via the e-liquid guide ceramic, where the e-liquid guide ceramic having a stable e-liquid guide amount guides quantitative e-liquid to the e-liquid guide cotton, and then the e-liquid guide cotton delivers the e-liquid to the atomization surface of the atomization piece for ultrasonic atomization, so that the e-liquid guided to the atomization surface of the atomization piece is also quantitative, the atomization efficiency of e-liquid on the atomization piece is higher, the amount of smoke is more stable, and the phenomenon that e-liquid is inhaled by user because the atomization piece is immersed in e-liquid can be reduced or avoided.

In addition, the e-liquid guide cotton is relatively soft, and can better abut against and contact the atomization piece during assembly, so that the e-liquid can penetrate into the surface of the atomization piece timely, and the atomization effect of the ultrasonic atomizer is better. Meanwhile, the e-liquid guide cotton is very thin. Because the smoke generated during the ultrasonic atomization has certain power, when the smoke passes through the e-liquid guide cotton and sprays to the e-liquid guide ceramic above the e-liquid guide cotton, the e-liquid guide ceramic can absorb large-particle e-liquid droplets carried by the smoke. Therefore, the present invention can reduce the probability that the user inhales e-liquid droplets, which improves user experience.

Further, the e-liquid guide ceramic and the e-liquid guide cotton can be bonded together by high temperature glue, or the e-liquid guide cotton and the e-liquid guide ceramic can be stably connected together by clamping, so as to improve production reliability and facilitate assembly.

Specifically, the e-liquid guide assembly is mounted at the lower part of the e-liquid storage assembly, the e-liquid storage assembly is provided with a mounting groove connecting an e-liquid bin with an atomization cavity, and the e-liquid guide assembly is mounted in the e-liquid storage assembly via the mounting groove.

Further, the top of the mounting groove is provided with anabutting portion protruding toward the mounting groove, a mounting step is provided in the mounting groove, the lower surface of the e-liquid guide ceramic is placed on the mounting step, and the upper surface of the e-liquid guide ceramic is abutted and fixed by the abutting portion, so that the assembled e-liquid guide ceramic can be prevented from being separated from the mounting groove.

In order to make the mounted e-liquid guide ceramic stable, the e-liquid guide ceramic includes a ceramic body in direct contact with e-liquid in the e-liquid bin, and at least two e-liquid guide legs arranged at the bottom of the ceramic body; the mounting steps are two levels of steps, two ends of the ceramic body are placed on the first-level mounting step, and the e-liquid guide legs are placed on the second-level mounting step.

In order to better fix the e-liquid guide cotton and guide the e-liquid, two ends of the e-liquid guide cotton cover the bottom of the e-liquid guide ceramic, and are abutted against and mounted in the mounting groove by the e-liquid guide ceramic.

Specifically, the ultrasonic atomizer further includes an e-liquid storage assembly and an atomization assembly connected to each other, the atomization assembly includes an atomization head, and the atomization head includes an atomization sleeve which is conductive and hollow; and an atomization piece for ultrasonic atomization, an insulating seat for supporting the atomization piece, and an electrode assembly for electrically connecting the atomization piece with an external power supply are sequentially arranged in the inner cavity of the atomization sleeve from top to bottom.

Specifically, an atomization cavity is formed between the e-liquid guide ceramic and the atomization piece, an air outlet channel connecting the atomization cavity with outside air is formed in the e-liquid storage assembly, and an air inlet channel connecting outside air with the atomization cavity is formed in the atomization assembly and the e-liquid storage assembly.

In order to simplify the electrical connection of the atomization piece, the upper end of the atomization sleeve abuts an upper surface electrode of the atomization piece, the lower end of the atomization sleeve is electrically connected to a negative terminal of the electrode assembly, and a lower surface electrode of the atomization piece is electrically connected to a positive terminal of the electrode assembly.

Compared with the prior art, the present invention has the following beneficial effects:

The present invention uses a combination of e-liquid guide ceramic and e-liquid guide cotton to guide an e-liquid, the e-liquid guide ceramic is directly connected with e-liquid in the e-liquid bin, and then the e-liquid is guided to the ultrasonic atomization piece by the e-liquid guide cotton because the e-liquid guide rate of the e-liquid guide ceramic is not affected by the temperature of e-liquid, the e-liquid guide amount of the e-liquid guide assembly is constant during ultrasonic atomization, thus the ultrasonic atomization efficiency of e-liquid is high, the amount of smoke is stable, and the phenomenon that the user inhales e-liquid droplets due to insufficient atomization caused by immersion of the ultrasonic atomization piece in e-liquid and the phenomenon that the ultrasonic atomization piece is dry-burnt due to little e-liquid are avoided.

1. E-liquid storage assembly; 11. Housing; 12. Plug; 13. E-liquid bin; 14. Air outlet channel; 121. Mounting groove; 122. Abutting portion; 123. First-level mounting step; 124. Second-level mounting step;
2. E-liquid guide assembly; 21. E-liquid guide ceramic; 22. E-liquid guide cotton; 23. Spring; 211. Ceramic body; 212. E-liquid guide leg;
3. Atomization assembly; 31. Base; 32. Atomization head; 33. Air inlet channel; 321. Atomization sleeve; 322. Atomization piece; 323. Insulating seat; 324. Electrode assembly; 3241. Positive terminal; 3242. Negative terminal;
4. Atomization cavity.

DETAILED DESCRIPTION OF THE EMBODIMENTS

The present invention will be further described below with reference to specific preferred embodiments, but the scope of protection of the present invention is not limited thereby.

For the convenience of description, the relative positional relationships of components, such as upper, lower, left, and right, are described according to the layout directions of the drawings in the specification, and do not limit the structure of this patent application.

Embodiment 1

Figure 1:
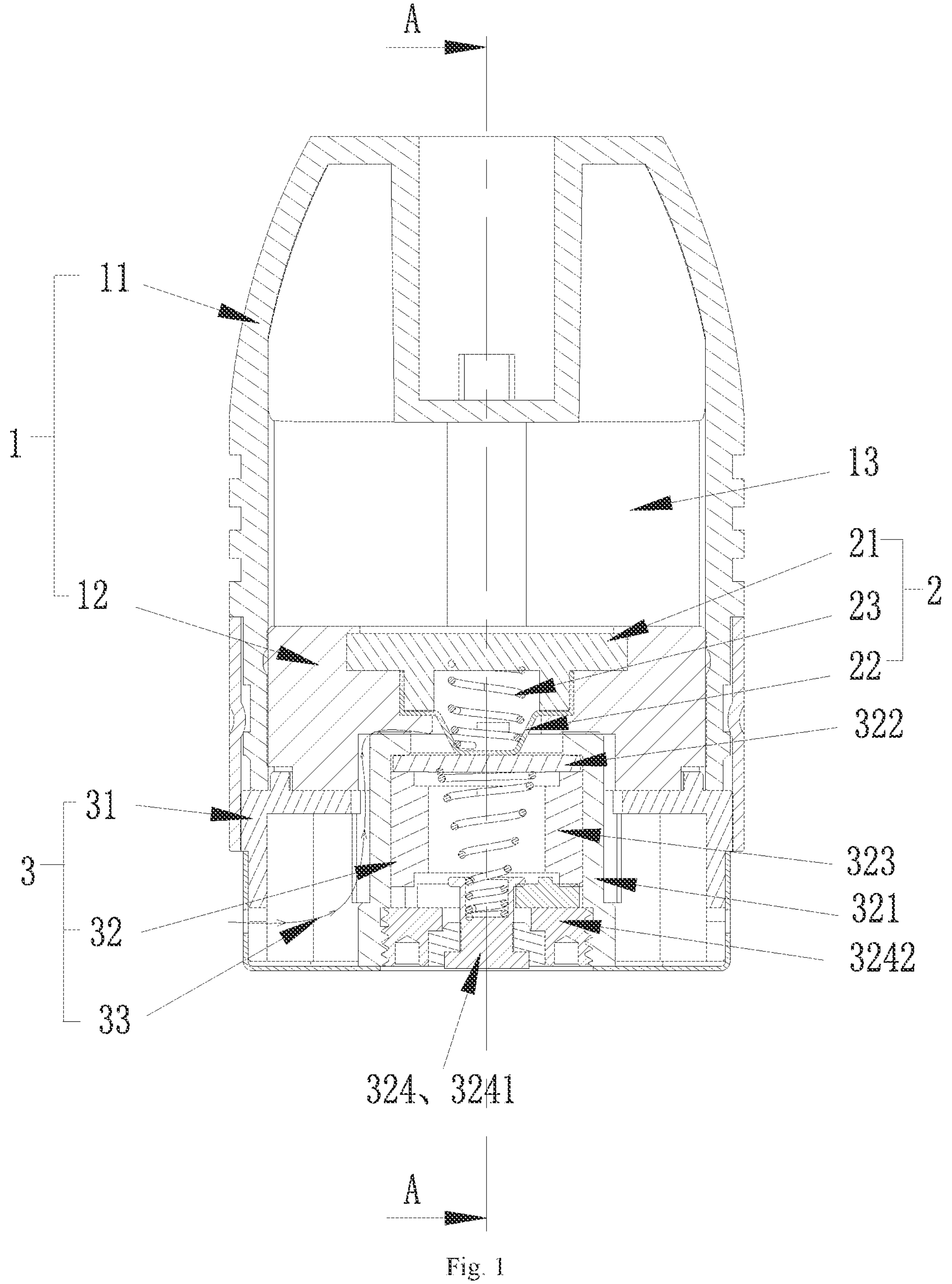
FIG. 1 is a front sectional view of a first embodiment of an atomizer according to the present invention.
Figure 2:
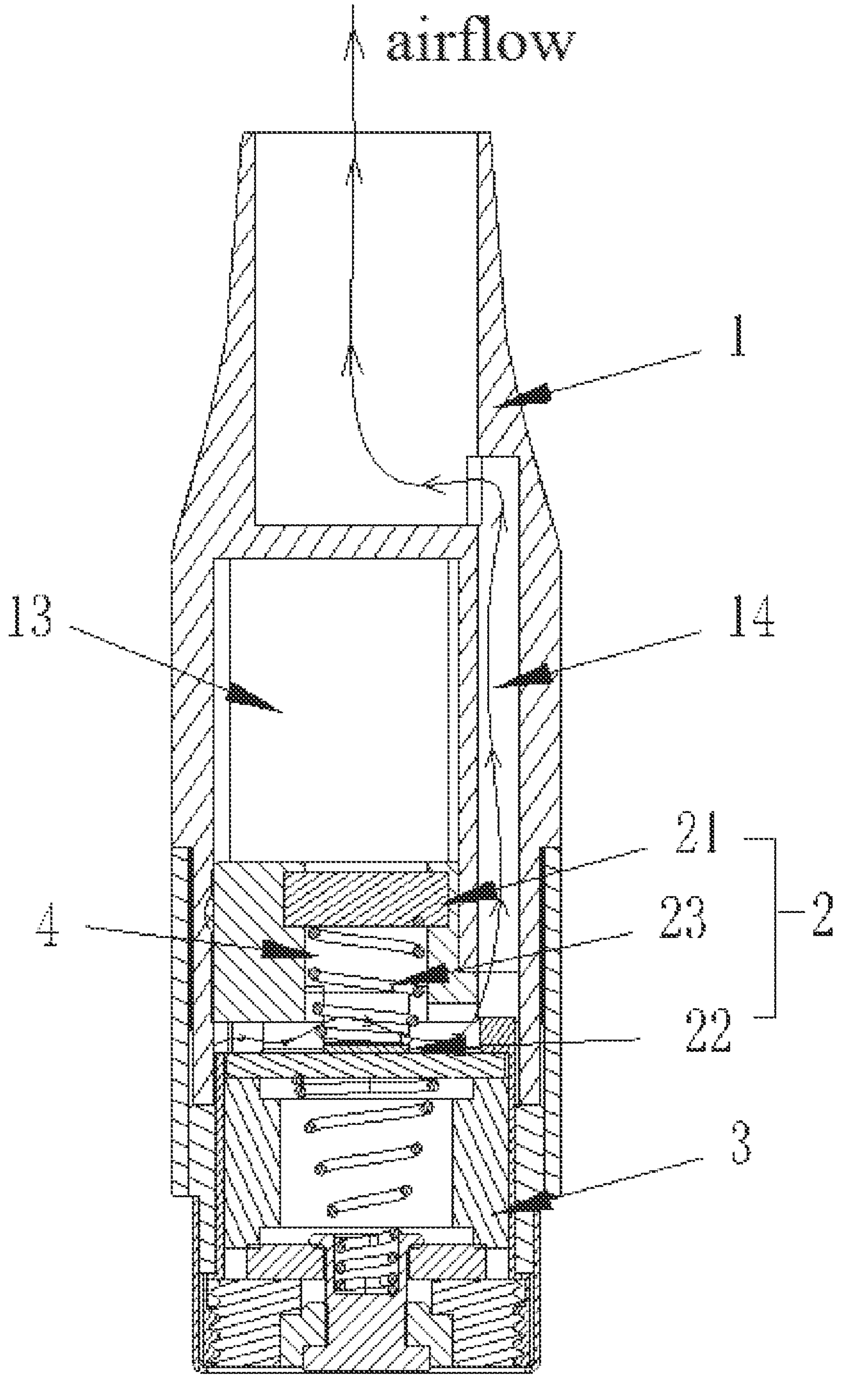
FIG. 2 is a cross-sectional view taken along line A-A of FIG. 1, in which arrows indicate the direction of airflow.
Figure 3:
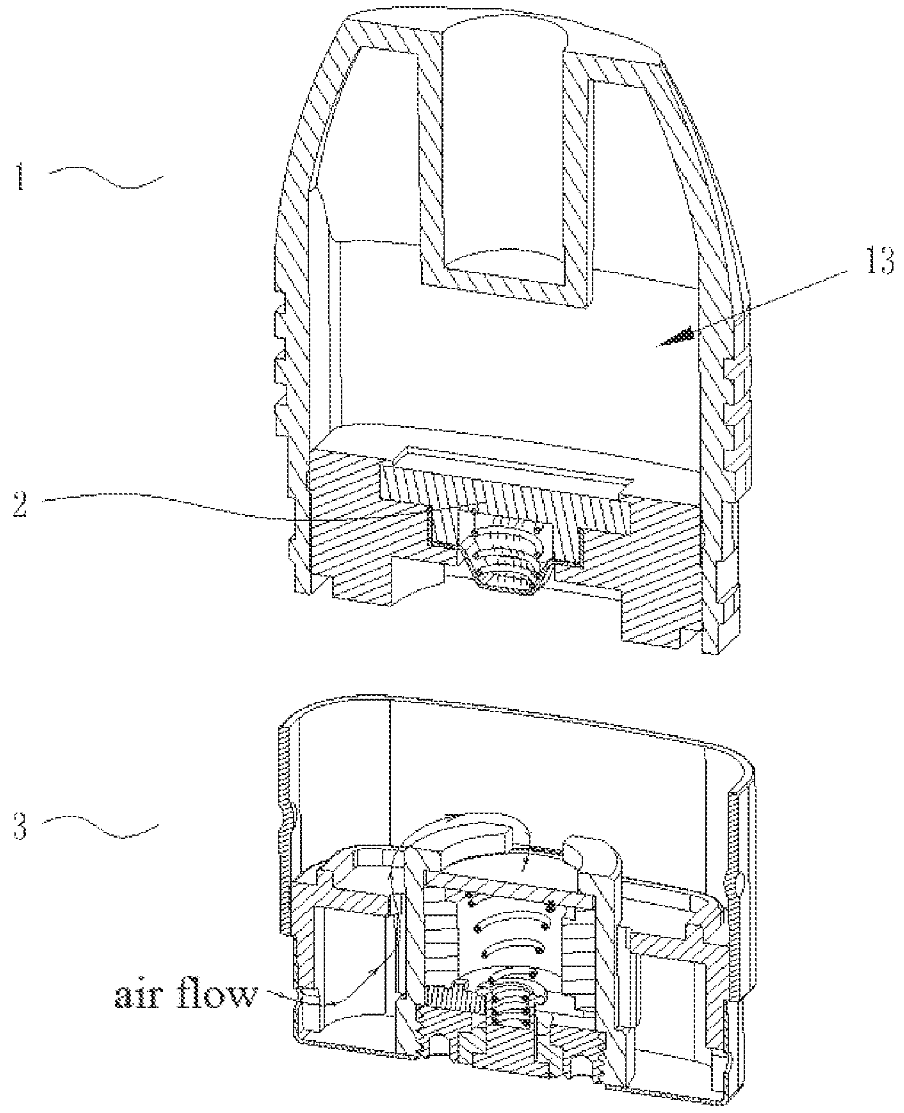
FIG. 3 is an exploded view of components in the first embodiment of the atomizer according to the present invention.
Figure 4:
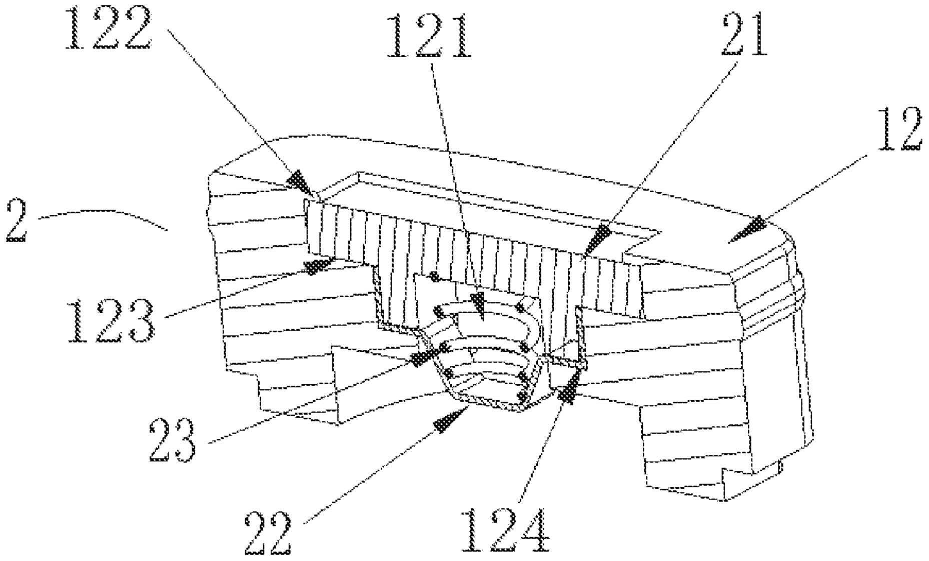
FIG. 4 is a three-dimensional sectional structural view of a plug of an e-liquid storage assembly according to the present invention.
Figure 5:
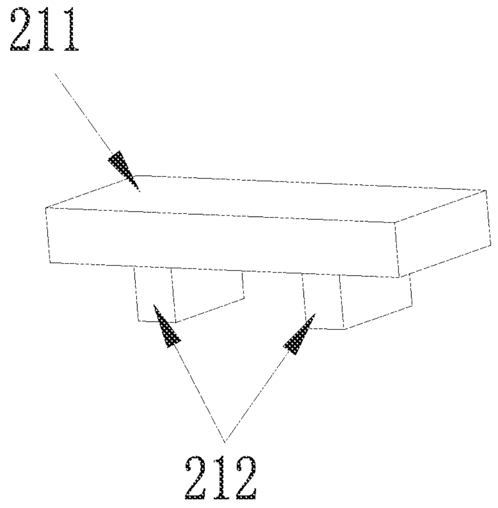
FIG. 5 is a three-dimensional structural view of an e-liquid guide ceramic according to the present invention.
Figure 6:
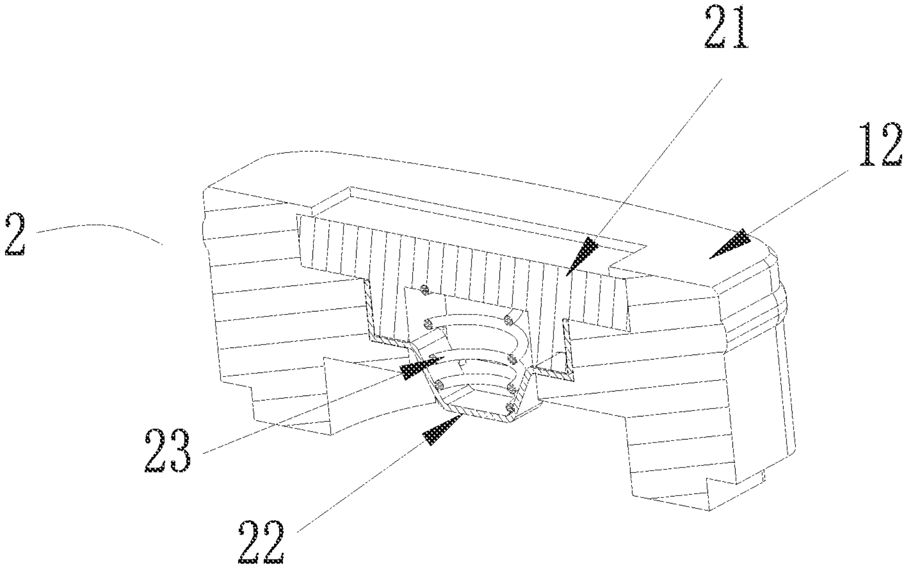
FIG. 6 is an assembly structural view of an e-liquid guide assembly and the plug of the e-liquid storage assembly according to the present invention.

As shown in FIGS. 1-6, an atomizer of this embodiment includes an e-liquid storage assembly 1, an e-liquid guide assembly 2 arranged at the bottom of the e-liquid storage assembly 1, and an atomization assembly 3 clamped with the e-liquid storage assembly 1.

The e-liquid storage assembly 1 includes a housing 11 and a plug 12 connected to each other, and the housing 11 and the plug 12 are connected to form a structure with an e-liquid bin 13 formed inside. The plug 12 is preferably an elastic silica gel plug.

The middle part of the plug 12 is provided with a mounting groove 121, the top of the mounting groove 121 is provided with an abutting portion 122 protruding toward the mounting groove 121, and a first-level mounting step 123 and a second-level mounting step 124 are sequentially provided in the mounting groove 121 from top to bottom.

The e-liquid guide assembly 2 includes an e-liquid guide ceramic 21 arranged at an upper part of the e-liquid guide assembly 2, e-liquid guide cotton 22 arranged at a lower part of the e-liquid guide assembly 2, and a spring 23 between the e-liquid guide ceramic 21 and the e-liquid guide cotton 22.

The e-liquid guide ceramic 21 is a solid ceramic, and the solid ceramic is formed with micropores for conducting e-liquid.

The e-liquid guide ceramic 21 includes a ceramic body 211 in direct contact with e-liquid in the e-liquid bin 13, and two e-liquid guide legs 212 arranged at the bottom of the ceramic body 211; two ends of the ceramic body 211 are placed on the first-level mounting step 123 in the mounting groove 121, and the two e-liquid guide legs 212 are placed on the second-level mounting step 124.

Two ends of the e-liquid guide cotton 22 are abutted against the second-level mounting step 124 in the mounting groove 121 by the two e-liquid guide legs 212 of the e-liquid guide ceramic 21, and the two ends of the e-liquid guide cotton 22 cover the e-liquid guide leas 212.

The ceramic body 211 and the e-liquid guide leas 212 of the e-liquid guide ceramic 21 are integrally sintered from the same material. The ceramic body 211 is in direct contact with the e-liquid in the e-liquid bin 13, and absorbs and conducts the e-liquid to the e-liquid guide legs 212 and the e-liquid guide cotton 22. Because the porosity of the sintered e-liquid guide ceramic 21 is stable (the porosity is determined after the e-liquid guide ceramic 21 is sintered), no matter whether the temperature of the e-liquid is normal temperature or high temperature (the temperature when the e-liquid is not atomized) and no matter whether the viscosity of the e-liquid decreases or not, the amount of e-liquid passing through the e-liquid guide ceramic 21 per unit time is constant, and the e-liquid guide rate of the e-liquid guide ceramic 21 is stable. Therefore, the amount of e-liquid absorbed by and conducted on the e-liquid guide cotton 22 is stable, which can avoid the phenomenon that the atomization piece 322, which is in contact with the e-liquid guide cotton 22, is dry-burnt due to little e-liquid or immersed in excessive e-liquid.

In order to prevent the e-liquid guide ceramic 21 from falling out after assembly, the e-liquid guide ceramic 21 is abutted by the abutting portion 122 on the plug 12.

The atomization assembly 3 includes a base 31 which is hollow and an atomization head 32 arranged in the inner cavity of the base 31.

The atomization head 32 includes an atomization sleeve 321 which is conductive and hollow. An atomization piece 322, an insulating seat 323, and an electrode assembly 324 are sequentially arranged in the inner cavity of the atomization sleeve 321 from top to bottom. The electrode assembly 324 has a positive terminal 3241 and a negative terminal 3242 isolated from each other.

The upper end of the atomization sleeve 321 is abutted to an upper surface electrode of the atomization piece 322, the lower end of the atomization sleeve 321 is electrically connected to the negative terminal 3242 of the electrode assembly 324, and a lower surface electrode of the atomization piece 322 is electrically connected to the positive terminal 3241 of the electrode assembly 324.

The atomization piece 322 is in contact with the bottom of the e-liquid guide cotton 22, an atomization cavity 4 is formed between the atomization piece 322 and the e-liquid guide ceramic 21, an air outlet channel 14 connecting the atomization cavity 4 with outside air is formed in the e-liquid storage assembly 1, and an air inlet channel 33 connecting outside air with the atomization cavity 4 is formed in the atomization assembly 3 and at the lower part of the e-liquid storage assembly 1.

When this embodiment is used, a user inhales from the outer end of the air outlet channel 14 of the e-liquid storage assembly 1, outside air enters the atomization cavity 4 from the air inlet channel 33, e-liquid is guided from the e-liquid bin 13 to the atomization piece 322 via the e-liquid guide assembly 2, the atomization piece 322 is electrically connected to an external power supply via the atomization sleeve 321 and the electrode assembly 324 to implement ultrasonic atomization, and smoke after the ultrasonic atomization flows to the user's mouth via the air outlet channel 14 and is inhaled by the user.

The forgoing descriptions are only preferred embodiments of the present application, and do not limit the present application in any form. Although the present application is disclosed above with the preferred embodiments, the present application is not limited thereto. Some variations or modifications made by any skilled person familiar with the art using the disclosed technical contents without departing from the scope of the technical solution of the present application are equivalent to the embodiments, and all fall within the scope of the technical solution.

The invention claimed is:

1. An ultrasonic atomizer, comprising an e-liquid guide assembly (2), wherein the e-liquid guide assembly (2) comprises an e-liquid guide ceramic (21) in direct contact with e-liquid, e-liquid guide cotton (22) which is located below the e-liquid guide ceramic (21) and directly connected to the e-liquid guide ceramic (21), and a spring (23) which is located between the e-liquid guide ceramic (21) and the e-liquid guide cotton (22) and abuts the e-liquid guide cotton (22) against an atomization piece (322); the e-liquid guide ceramic (21) is a solid ceramic, and micropores which are used for conducting the e-liquid are integrally formed in the e-liquid guide ceramic (21); and the ultrasonic atomizer further comprises an e-liquid storage assembly (1) and an atomization assembly (3) connected to each other, wherein the atomization assembly (3) comprises an atomization head (32), and the atomization head (32) comprises an atomization sleeve (321) which is conductive and hollow; and the atomization piece (322) for ultrasonic atomization, an insulating seat (323) for supporting the atomization piece (322), and an electrode assembly (324) for electrically connecting the atomization piece (322) with an external power supply are sequentially arranged in an inner cavity of the atomization sleeve (321) from top to bottom.

2. The ultrasonic atomizer according to claim 1, wherein the e-liquid guide assembly (2) is mounted at a lower part of the e-liquid storage assembly (1), the e-liquid storage assembly (1) is provided with a mounting groove (121) connecting an e-liquid bin (13) with an atomization cavity (4), and the e-liquid guide assembly (2) is mounted in the e-liquid storage assembly (1) via the mounting groove (121).

3. The ultrasonic atomizer according to claim 2, wherein a top of the mounting groove (121) is provided with an abutting portion (122) protruding toward the mounting groove (121), mounting steps are provided in the mounting groove (121), a lower surface of the e-liquid guide ceramic (21) is placed on the mounting step, and an upper surface of the e-liquid guide ceramic (21) is abutted and fixed by the abutting portion (122).

4. The ultrasonic atomizer according to claim 3, wherein the e-liquid guide ceramic (21) comprises a ceramic body (211) in direct contact with the e-liquid in the e-liquid bin (13), and at least two e-liquid guide legs (212) arranged at a bottom of the ceramic body (211); the mounting steps are two levels of steps, two ends of the ceramic body (211) are placed on a first-level mounting step (123) of the mounting steps, and the at least two e-liquid guide legs (212) are placed on a second-level mounting step (124) of the mounting steps.

5. The ultrasonic atomizer according to claim 2, wherein two ends of the e-liquid guide cotton (22) cover a bottom of the e-liquid guide ceramic (21), and are abutted in the mounting groove (121) by the e-liquid guide ceramic (21).

6. The ultrasonic atomizer according to claim 1, wherein an atomization cavity (4) is formed between the e-liquid guide ceramic (21) and the atomization piece (322), an air outlet channel (14) connecting the atomization cavity (4)

with outside air is formed in the e-liquid storage assembly (1), and an air inlet channel (33) connecting outside air with the atomization cavity (4) is formed in the atomization assembly (3) and the e-liquid storage assembly (1).

7. The ultrasonic atomizer according to claim 1, wherein an upper end of the atomization sleeve (321) is abutted to an upper surface electrode of the atomization piece (322), a lower end of the atomization sleeve (321) is electrically connected to a negative terminal (3242) of the electrode assembly (324), and a lower surface electrode of the atomization piece (322) is electrically connected to a positive terminal (3241) of the electrode assembly (324).

* * * * *